Aug. 30, 1932.                B. M. LEECE                1,875,041
            CONTROL FOR BATTERY CHARGING AND LIGHTING SYSTEMS
                    Filed July 12, 1929        2 Sheets-Sheet 1
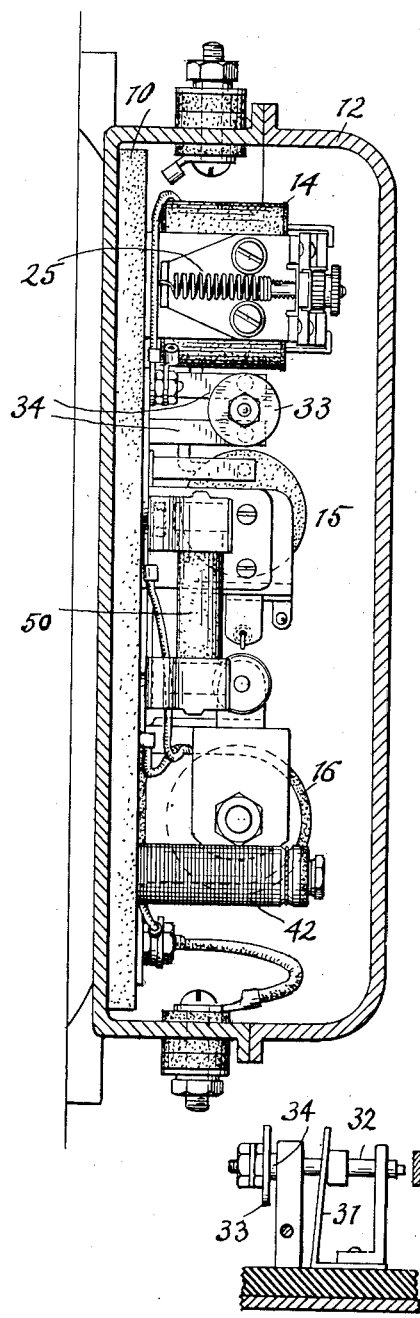
Fig. 2.
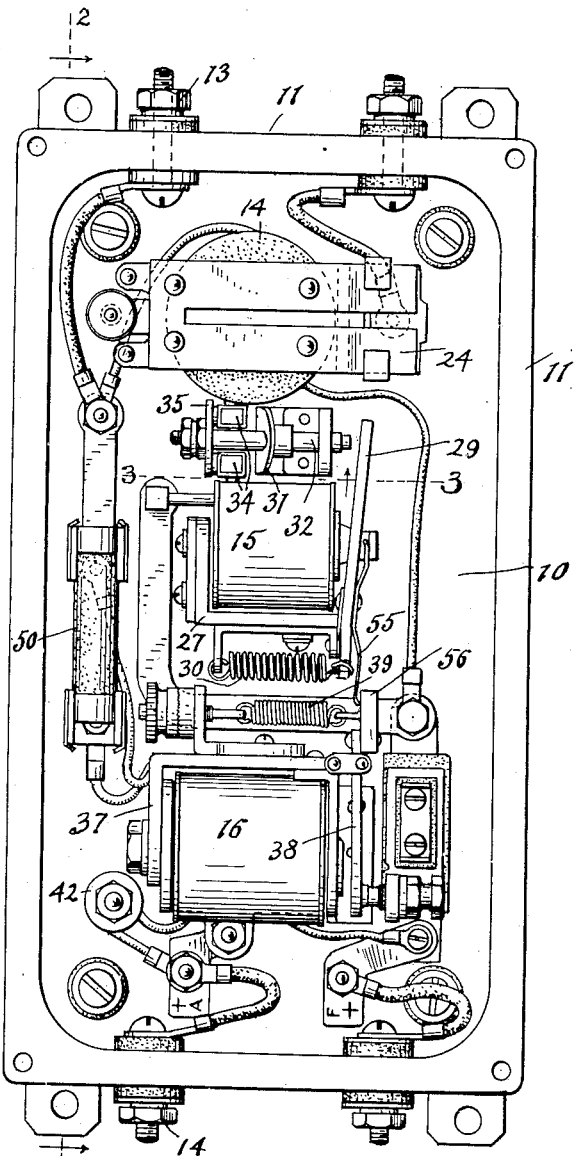
Fig. 1.
Fig. 3.
Inventor
Bennett M. Leece
Hers Hudson & Kent
attys.

Aug. 30, 1932. B. M. LEECE 1,875,041
CONTROL FOR BATTERY CHARGING AND LIGHTING SYSTEMS
Filed July 12, 1929 2 Sheets-Sheet 2

Inventor
Bennett M. Leece
Ross Hudson & Kent
attys.

Patented Aug. 30, 1932

1,875,041

UNITED STATES PATENT OFFICE

BENNETT M. LEECE, OF CLEVELAND, OHIO, ASSIGNOR TO THE LEECE-NEVILLE COMPANY, OF CLEVELAND, OHIO, A CORPORATION OF OHIO

CONTROL FOR BATTERY CHARGING AND LIGHTING SYSTEMS

Application filed July 12, 1929. Serial No. 377,720.

This invention relates to an improved control for battery charging and lighting systems, particularly those employed on vehicles such as land vehicles and aeroplanes. The present invention is an improvement over the subject matter of my prior Patent 1,692,216, granted November 20, 1928.

As brought out in my patent above referred to, should the cut-out be jolted it is liable to be closed and then magnetically held in closed position by the heavy flow of battery current, and thus fail to function to disconnect the battery from the generator, causing the complete discharge of the battery. As noted in my patent, this condition may prevail in certain installations on land vehicles and I find also that it is liable to occur with aeroplane equipment when the plane is landing and bumps along the landing field. To overcome this difficulty I provided, in accordance with my patent, a magnet which might be a special magnet provided for this purpose or one which served normally as a current regulator, to reduce the ampere turns of the series coil of the cut-out so as to prevent the armature of the cut-out being held in closed position by the heavy battery current flowing through the series coil. This was accomplished in accordance with the specific disclosure of my patent by causing the said magnet to short-circuit the series coil.

The arrangement shown in my prior patent is satisfactory in many instances, but it has been found that in some installations, particularly those employing a generator of fairly large capacity and employing a cut-out having a series coil of large wire and few turns, the resistance of the series coil or the voltage drop across its terminals is not sufficient to enable the short-circuiting of the coil to reduce the ampere turns of the series coil enough to bring about the opening of the cut-out.

The present invention is an improvement over the system shown in my patent in the respect that when the cut-out is accidentally closed and a heavy flow of battery current takes place, the circuit of the series coil of the cut-out is opened. As another feature of my invention the accidental closure of the cut-out and reversal of current causes also the disconnection from the battery of the shunt or potential coil of the cut-out so as to avoid the likelihood of the cut-out being held closed by the shunt coil alone in the absence of any neutralizing action of the series coil.

The above results are accomplished by my invention by providing in connection with the cut-out a magnetically operated switch which does either and preferably the two things mentioned above, to wit: Opens the circuit of the series coil of the cut-out and disconnects the shunt coil on the accidental closure of the cut-out, followed by the reversal of current. This switch may comprise a magnet which serves solely to open the series coil and disconnect the shunt coil of the cut-out, or it may be one which functions normally as a regulating magnet such as one which controls the current output of the generator, and which under the abnormal conditions mentioned above as when the cut-out is accidentally closed and a rush of battery current flows through its coil, serves to positively open the circuit of the series coil of the cut-out and disconnect the shunt coil from the battery. If it serves normally as a regulating magnet, it may be arranged to have a regulating effect in different ways, such as by mechanically effecting the action of a vibrating regulator adapted primarily to control the voltage of the generator, or as an independent regulating magnet to control the ampere turns of the field winding of the generator independently of the control effected by the vibrating voltage regulator.

The invention may be further briefly summarized as consisting in certain novel details of construction and combinations and arrangements of parts which will be described in the specification and set forth in the appended claims.

In the accompanying sheet of drawings:

Figure 1 is a face view of the control elements in a box or casing, for a system such as those with which my invention finds especial utility, the cover of the box being removed.

Fig. 2 is a sectional view substantially on the line 2—2 of Fig. 1.

Fig. 3 is a detail sectional view substantially along the line 3—3 of Fig. 1.

Figure 5:
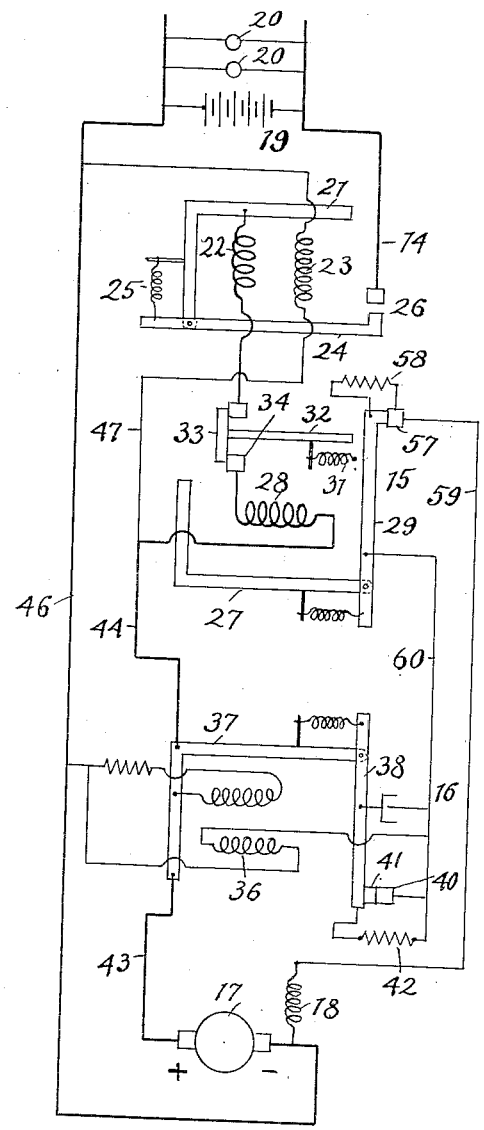
Fig. 5 is a similar view showing another form of the invention wherein the magnet referred to has a regulating action of a different kind.

Referring now to the drawings, the control elements, including the cut-out with its associated magnet to insure its operation, and such regulators as may be employed, are carried by an insulating base 10 in a box or casing 11 having a removable cover 12. At the ends of the box there are shown terminals 13 and 14 to make the necessary electrical connections with the battery and generator. In the box are the reverse current cut-out designated as a whole by the reference character 14, the magnet 15 which as before stated may serve simply as a switch to insure the proper functioning of the cut-out, or both as a switch for this purpose and as a regulating magnet, and 16 designates a vibrating regulator which may serve as a voltage regulator or in conjunction with the magnet 15 as a regulator for both current and voltage. The specific arrangement and form of these control elements as illustrated are not important to my invention, and accordingly reference is had particularly to the diagrammatic views which clearly illustrate the invention in simplified form.

Figure 4:
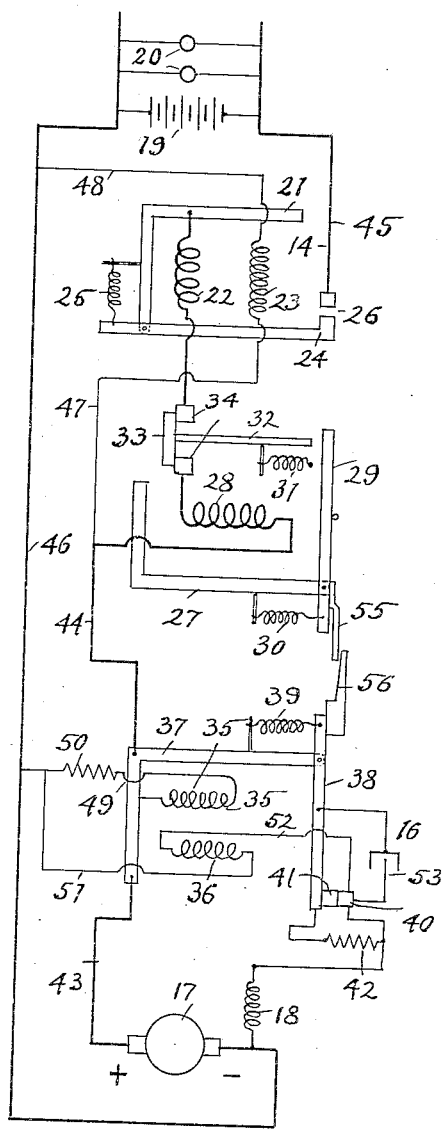
Fig. 4 is a diagrammatic view showing the electrical connections and circuits and embodying one form of my invention wherein the magnet used to insure the proper functioning of the cut-out has a regulating action of one kind.

Referring first to Fig. 4, a shunt generator 17 is employed having a field winding 18. The load may consist of the usual elements such as a starting and lighting battery 19 and lamps 20. When my invention is employed on aeroplanes other elements forming parts of radio receiving or transmitting sets may constitute part of the load. The reverse current cut-out 14 may consist of the usual elements namely, a magnet frame 21 having a series coil 22, a shunt coil 23, and a pivoted armature 24 biased toward open position by a spring 25 and adapted to open and close the generator-load circuit at the contacts 26.

The magnet 15 associated with the cut-out 14 preferably comprises a frame 27, a series coil 28, a pivoted armature 29 biased toward open position by a spring 30 and adapted, when the series coil 28 is traversed by an abnormal amount of current, as when the cut-out is accidentally closed and there is a heavy flow of current from the battery through the generator, to open a switch which is normally biased toward closed position by a spring 31. This switch as herein illustrated consists of a plunger 32 carrying a bridging contact 33 adapted to engage two contacts 34 in the circuit between the series coil 22 of the cut-out 14 and the series coil 28 of the magnet 15.

In Figs. 4 and 5 the spring 31 is, for convenience, shown as a coil spring but in reality is a leaf spring as illustrated in Figs. 1 and 3.

The regulator 16 which is preferably a vibrating voltage regulator may have one coil or two coils, but preferably a two coil regulator is employed in which event the coils will be connected in all essential respects and will function like the similar coils of my prior Patents 1,540,698 and 1,633,671. If the regulator has two coils 35 and 36, as is preferred, they will be mounted on a common core forming a part of the frame 37, having a pivoted armature 38 biased toward closed position by a spring 39. Likewise, this regulator has a stationary contact 40 and movable contact 41 carried by the armature 38, these contacts serving when closed to short-circuit a field resistance 42, and when open to throw the resistance into the field circuit. Likewise, the opening and closing of these contacts varies the current passing through the coil 36.

The circuit connections may be briefly described as follows: One terminal of the generator is here shown connected by conductor 43 to the field frame 37 of the vibrating regulator, and the field frame 37 is connected by conductor 44 to the series coil 28 of the magnet 15. This coil is connected through the switch 33, 34 to the series coil 22 of the cut-out 14, and the latter is connected to the field frame 21 of the cut-out, the stationary contact of the cut-out being connected by conductor 45 to one side of the load circuit. The other side of the load circuit is connected by conductor 46 to the other terminal of the generator.

One terminal of the shunt coil 23 of the cut-out is connected by conductor 47 to the conductor 44 on the generator side of the switch 33, 34 so that this switch when open will disconnect the coil from the battery. The other terminal of the shunt coil 23 of the cut-out is connected by the conductor 48 to the conductor 46 so that the shunt coil 23 is normally connected in shunt to the generator.

The coil 35 of the regulator 16 has one terminal connected to the field frame 37 and its other terminal connected by a conductor 49 to the main current carrying conductor 46. Thus this coil 35 is in effect connected across the terminals of the generator though its circuit is not affected by the opening or closing of the contacts 40, 41 of the regulator. That is to say, the coil 35 which may be termed the primary coil corresponds to the coil 21 of my Patent 1,540,698, and to the coil 18 of my Patent 1,633,671. The coil 36 corresponds to the coil 22 of my Patent 1,540,698 and to the coil 19 of my Patent 1,633,671. Preferably, though not necessarily, a resistance 50 is in the conductor 49 which is connected to one terminal of the coil 35 as above described. This resistance in some instances may have a positive, and in other instances a negative temperature coefficient.

The coil 36 of the vibrator regulator 16 has one terminal connected by the conductor 51 to the conductor 49 (between the resistance 50 and the conductor 46). The other terminal is connected by conductor 52 to the stationary contact 40.

The contacts 40, 41 of the vibrating regulator may be bridged by a condenser 53.

The field resistance 42 is here shown as having one terminal connected to stationary contact 40 and its other terminal suitably connected to the field frame of the vibrating regulator, though for convenience of illustration it is shown connected to the armature 38.

Thus the circuits may be traced as follows: The load circuit is from one terminal of the generator, which may be assumed to be the positive terminal, to the field frame 37, through the series coil 28, the switch 33, 34, the series coil 22 of the cut-out, and through the contacts 26 to one side of the load circuit, the other side of the load circuit being by way of conductor 46 to the other terminal of the generator.

The field circuit of the generator is as follows: from one terminal of the generator through the field winding, across the contacts 40, 41 of the vibrating regulator when the latter are closed (around the resistance 42) to the field frame 37, and to the opposite side of the generator. When the contacts 40, 41 are open the circuit is the same except that the resistance 42 is in the field circuit.

The circuit of the shunt winding 23 of the cut-out is from conductor 44 to conductor 46 i. e. across the terminals of the generator. When switch 33, 34 is opened the battery-generator circuit is opened and the shunt coil 23 is disconnected from the battery though it remains connected to the cross terminals of the generator.

The circuit of the regulating coil 35 is at all times from the frame 37 through the resistance 50 to the conductor 46 and, therefore, at all times across the terminals of the generator. When the contacts 40, 41 are closed the coil 36 is likewise connected directly across the terminals of the generator i. e. from conductor 49 (and therefore from one terminal of the generator) through this coil, across the contacts 40, 41 to the frame 37, and to the other terminal of the generator. When the contacts are open the ampere turns of the coil 36 are greatly reduced though the circuit of the coil is not actually opened since it is then connected across the terminals of the generator, through the field resistance 42 substantially as in my prior Patents 1,540,698 and 1,633,671.

It will be understood that in practice the specific connections described above need not and preferably will not be employed.

Without at this time describing any current or regulating effect that the magnet 15 may have, it will be seen that under normal operation, while the generator is supplying current to the battery or to the load generally, the switch 33, 34 will remain closed and all parts will function in the usual way, including the voltage regulator which will regulate for slight changes in voltage. Normally when the engine driving the generator is stopped, or is slowed down so that the voltage of the generator is less than that of the battery, the cut-out will function in the usual way. If, however, when the voltage of the battery is not opposed by any material voltage of the generator, as when the engine is dead or turning over slowly, should the circuit-breaker be jarred closed, there will be a heavy rush of current from the battery through the armature of the generator, and through the coil 28 of the magnet 15 and the coil 22 of the cut-out. This energizes the coil 28 sufficiently to cause the armature 29 to engage and move the plunger 32 of the switch 33, 34 so as to separate the bridging contact from the stationary contacts 34. This immediately opens the battery-generator circuit and at the same time disconnects the shunt coil 23 of the cut-out from the battery, whereupon the cut-out immediately opens, since it cannot be held closed either by the series coil or by the shunt coil, both then being disconnected from the battery and therefore deenergized. The opening of the switch 33, 34 also opens the circuit of the coil 28, whereupon the switch 33, 34 closes. Should the cut-out armature again be jolted to closed position, the same procedure takes place.

As before stated, the magnet 15 need have no regulating action in which event it may comprise the parts explained above and may function as explained. However, it may have a current regulating action in more than one way. For example, the armature 29 may be provided with an extension 55 which lies along an extension 56 of the voltage regulator armature 38. When the load is below a predetermined value, the extension 55 of the armature 29 will not engage the extension 56 of armature 38, and the vibrating regulator will regulate for voltage only. When the load reaches a predetermined value, the armature 29 will be attracted sufficiently by the field created by the current passing through the coil of magnet 15 to cause this extension 55 to press on the extension 56 of armature 38, the effect being to weaken or act against the spring 39. This action is precisely as described in my pending application Serial No. 255,585, filed February 20, 1928. Thus the regulator 38 may regulate for voltage alone or for both current and voltage with the assistance of the magnet 15. When the magnet 15 has a current regulating action the armature 29 remains out of engagement with the plunger 32 of the switch 33, 34, but when the coil 28 is traversed by the heavy battery current, its ampere turns become sufficient to cause the armature 29 to push the plunger 32 axially and open the circuit at the contacts 33, 34.

With the arrangement shown in Figs. 1 to 4, the magnet 15 has a current regulating action by the mechanical force which it exerts on the armature 38 of the vibrating regulator in opposition to its spring 39. It may however have a direct electrical current regulating action as with the arrangement shown in Fig. 5. In this figure the generator, cut-out, and vibrating regulator function precisely as before, except that the armature 38 of the vibrating regulator does not have the extension 56 and the armature 29 of the magnet 15 does not have its extension by which the armature 29 may exert a force on the armature 38. Therefore, the electrical connections being the same as before, these elements need not be again described and their circuits traced. In this instance however the armature 29 serves to open and close contacts 57 and a separate field resistance 58 is provided which is controlled by these contacts. As shown in Fig. 5, the field winding 18 is connected by a conductor 59 to the stationary contact 57, and the frame 27 or armature 29 is connected by a conductor 60 to the stationary contact 40 of the vibrating regulator. Inasmuch as the contacts 57 are bridged by the field resistance 58, the latter is connected into the field circuit when the contacts are open. When the latter are closed, the field resistance 58 is short-circuited. The field resistance 42 is connected as before so that when the contacts 40, 41 are open the field 42 is in the field circuit and when they are closed, this field resistance is short-circuited. It follows that when the two sets of contacts 40, 41 and 57, 57 are both open, the two field resistances 42 and 58 are connected in series in the field circuit.

The plunger 32 of the switch 33, 34 is arranged as before to be actuated by the armature 29 when the series coil 28 of the magnet 15 is energized by an abnormally heavy current as by a rush of battery current if the cut-out should be accidentally closed with the generator dead or substantially so, as during the landing of a plane. This, as before, opens the circuit of the battery-generator circuit, including the series coils 22 and 28 and disconnects the shunt coil 23 of the cut-out from the battery. During the normal functioning of the current regulator and switch actuator 15, the contacts 57, 57 will remain closed until the load current reaches a predetermined value whereupon the armature will be vibrated cutting in and out the resistance 58. During such vibration, and as long as the series coil 28 is traversed by current from the generator, no matter how heavy the load, the switch plunger 32 is not actuated and as before stated, it is only when the current reverses in the battery-generator circuit under the conditions previously mentioned, that the coil 28 is sufficiently energized to cause the armature 29 to open the switch 33, 34.

Thus it will be seen that I have provided a magnet operating in conjunction with the reverse current cut-out and having a coil which, when traversed by an abnormally heavy current, makes it impossible for either the series coil or the shunt coil of the cut-out to hold the armature of the cut-out in closed position, and that this magnet may perform that function alone i. e. may have no regulating action, or it may serve normally as a regulator for the generator, in this instance a current regulator, and if it has the dual functions just mentioned, its regulating action may be made effective in conjunction or cooperation with the vibrating element of the voltage regulator or wholly independently of the latter.

Thus, while I have described three different forms of my invention, I do not wish to be limited thereto as the principle of my invention may be carried out in still different ways. Likewise, the relative arrangements of the parts may, of course, be varied and the effective circuit connections modified without departing from the spirit and scope of the invention in its broadest aspects.

Having thus described my invention, I claim:

1. In a system such as described, a generator, a battery adapted to be connected thereto, a reverse current cut-out between the generator and the battery and having series and shunt coils, and a switch for opening the circuit of the series coil and for disconnecting the shunt coil from the battery.

2. In a system of the character described, a generator, a battery adapted to be connected thereto, a reverse current cut-out having series and shunt coils connected to the generator-battery circuit, and a switch having a series coil for opening the generator-battery circuit and for disconnecting the shunt coil from the battery when its series coil is traversed by an abnormally heavy battery current.

3. In a system such as described, a generator, a battery adapted to be connected thereto, a reverse current cut-out having series and shunt coils connected to the generator-battery circuit, and a regulator comprising a magnet for varying the ampere turns of the field winding of the generator, and having provision for opening the generator-battery circuit.

4. In a system such as described, a generator, a battery adapted to be connected thereto, a reverse current cut-out having series and shunt coils connected to the generator-battery circuit, and a regulator comprising a magnet for varying the ampere turns of the field winding of the generator, and having provision for disconnecting the shunt coil of the cut-out from the battery.

5. In a system such as described, a generator, a battery adapted to be connected thereto, a reverse current cut-out having series and shunt coils connected to the generator-battery circuit, and a regulator serving normally to regulate the generator and having provision for rendering both coils of the cut-out ineffective to hold the cut-out closed on the flow of heavy battery current through the generator-battery circuit.

6. In a system such as described, a generator, a battery adapted to be connected thereto, a reverse current cut-out having series and shunt coils connected to the generator-battery circuit, a magnet having a winding and a vibrating armature, and a switch operable by the armature for rendering the cut-out ineffective to keep the generator-battery circuit closed when said winding is traversed by heavy battery current.

7. In a system such as described, a generator, a battery adapted to be connected thereto, a reverse current cut-out having series and shunt coils, and a switch member adapted to be controlled thereby, current and voltage regulating means operable when the generator is supplying current to the battery or other load, and means operable by a part of said regulating means for rendering the cut-out ineffective to maintain the generator-battery circuit closed on the flow of heavy battery current through the generator-battery circuit.

In testimony whereof, I hereunto affix my signature.

BENNETT M. LEECE.